(12) United States Patent  
Gomez Lucia et al.

(10) Patent No.: US 10,200,554 B2
(45) Date of Patent: Feb. 5, 2019

(54) MEDIA SCAN OPERATION CONTROL (71) Applicant: Hewlett-Packard Development Company, L.P., Houston, TX (US)

(72) Inventors: Jorge Miguel Gomez Lucia, Vancouver, WA (US); John Andrew Bryson, Vancouver, WA (US); Justin M. Roman, Portland, OR (US); Russell Fredrickson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/569,886

(22) PCT Filed: May 22, 2015

(86) PCT No.: PCT/US2015/032285
§ 371 (c)(1),
(2) Date: Oct. 27, 2017

(87) PCT Pub. No.: WO2016/190845
PCT Pub. Date: Dec. 1, 2016

(65) Prior Publication Data
US 2018/0115670 A1     Apr. 26, 2018

(51) Int. Cl.
*H04N 1/00* (2006.01)
*H04N 1/047* (2006.01)
(Continued)

(52) U.S. Cl.
CPC ..... *H04N 1/00798* (2013.01); *H04N 1/00602* (2013.01); *H04N 1/00702* (2013.01);
(Continued)

(58) Field of Classification Search
CPC .................................................. H04N 1/00798
(Continued)

(56) References Cited

U.S. PATENT DOCUMENTS

| 6,081,687 A | 6/2000 | Munemori et al. |
| 6,168,333 B1 | 1/2001 | Merz et al. |

(Continued)

FOREIGN PATENT DOCUMENTS

| JP | 2002152465 | 5/2002 |
| JP | 2007-28170 | 8/2008 |

(Continued)

OTHER PUBLICATIONS

"Application Note: Line Scan Imaging Basics", DALSA technology with vision, Jan. 21, 2003, 11 pages.

*Primary Examiner* — Jacky X Zheng
(74) *Attorney, Agent, or Firm* — Mannava & Kang (57) ABSTRACT

According to an example, an apparatus for controlling a media scan operation may include a first scan module to scan a section of a media, a tracking mechanism to track the media as the media is moved past the first scan module, and a controller. The controller may receive signals corresponding to the media movement from the tracking mechanism, determine, based upon the received signals, a current position of the media, and vary a timing at which the first scan module collects a scan of the section of the media based upon the determined current position of the media.

14 Claims, 6 Drawing Sheets

(51) Int. Cl.
*H04N 1/028* (2006.01)
*H04N 1/10* (2006.01)
*H04N 1/193* (2006.01)

(52) U.S. Cl.
CPC ......... *H04N 1/02815* (2013.01); *H04N 1/047* (2013.01); *H04N 1/1048* (2013.01); *H04N 1/193* (2013.01); *H04N 2201/0081* (2013.01); *H04N 2201/04731* (2013.01); *H04N 2201/04737* (2013.01); *H04N 2201/04794* (2013.01)

(58) Field of Classification Search
USPC ........................................................ 358/1.2
See application file for complete search history.

(56) References Cited

U.S. PATENT DOCUMENTS

| | | | |
|---|---|---|---|
| 6,461,066 | B1 | 10/2002 | Kelley et al. |
| 6,880,819 | B2 | 4/2005 | Chen et al. |
| 7,518,767 | B2 | 4/2009 | Chen et al. |
| 8,305,658 | B2 | 11/2012 | Cheng |
| 8,556,368 | B2 | 10/2013 | Rosati et al. |
| 2007/0120938 | A1* | 5/2007 | Fitzpatrick ......... G03G 15/0163 347/116 |
| 2009/0190188 | A1 | 7/2009 | Delhomme et al. |
| 2010/0047000 | A1* | 2/2010 | Park ................... G03G 15/5062 399/394 |
| 2010/0072938 | A1 | 3/2010 | Reichert et al. |
| 2011/0292469 | A1* | 12/2011 | Takahashi .............. H04N 1/031 358/474 |
| 2012/0133995 | A1 | 5/2012 | Chun et al. |
| 2013/0120804 | A1 | 5/2013 | Murray |
| 2014/0071217 | A1 | 3/2014 | Dal Col et al. |
| 2015/0022864 | A1 | 1/2015 | Song |

FOREIGN PATENT DOCUMENTS

| | | |
|---|---|---|
| KR | 10-2009-0010786 | 1/2009 |
| KR | 10-0935201 | 1/2010 |
| KR | 10-2012-0029309 | 3/2012 |
| WO | WO-2015110459 | 7/2015 |

\* cited by examiner

MEDIA SCAN OPERATION CONTROL

BACKGROUND

Scanning devices are typically used to scan information on media such as paper. Particularly, scanning devices scan image information on media and convert the scanned image information into a digital image, which may be viewed on a display of a computing device. Scanning devices typically include a platen and a scan bar for scanning the media. The scan bar is typically positioned adjacent to the platen and includes a light source, a lens, and a sensor. The light source illuminates a portion of the media and the light reflected from the portion of the media impinges on the lens, which focuses the reflected light onto the sensor. The sensor converts the received focused light, which includes the information on the media, into a digital image. The media is advanced and a scanning operation is performed on another section of the media. This process is repeated until the entire media or desired section of the media has been scanned.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are apparatuses and methods for controlling a media scan operation, in which a controller may control the media scan operation based upon the actual detected position of the media. In contrast, scanning apparatuses may control media scanning operations based solely on timing, e.g., perform a scanning operation every 1.5 milliseconds. These types of scanning apparatuses typically operate under the assumption that the media has traveled the correct distance each time a scanning operation is performed. The media, however, typically does not maintain a constant velocity throughout the entire advancement of the media past a scan bar because the media is typically handled by multiple sets of rollers. That is, when the media is handed off from one set of rollers to another set of rollers, the media may initially experience a sudden decrease in velocity and then when the new set of rollers acts on the media, the media may experience a sharp acceleration. When the media is scanned following a predetermined time schedule while the media is experiencing these different velocities, a scan bar may not collect scans at the appropriate locations in the media. Thus, when the collected scans are stitched together, stitching errors may be visible.

The apparatuses and methods for controlling a media scan operation disclosed herein may prevent or reduce the occurrence of stitching errors in collected scans by timing the performance of scanning operations based upon the actual movement of the media. That is, the apparatus may include a tracking mechanism that is to track the actual movement of the media, for instance, by directly contacting the media with a wheel that rotates as the media is advanced. An encoder may track the rotation of the wheel and the tracked rotation may be used to determine the actual movement of the media. In addition, the movement of the media may be used to determine the current position of the media and based upon the determined current position, a controller may delay or speed up the timing at which a scan module collects a scan of a section of the media. That is, the controller may determine that the media has not yet reached the appropriate position at which a scanning operation is to be performed and may thus delay performance of the scanning operation until it is determined that the media as reached the appropriate position. Additionally, the controller may determine that the media has reached the appropriate position ahead of schedule and may cause the scanning operation to be performed earlier than would have been performed under a time-based scheduling.

According to an example, a corrective function may be applied to signals generated by the tracking mechanism to prevent or reduce runout errors. That is, a corrective function that compensates for eccentricities or defects in the tracking mechanism may be determined, for instance, through testing of the tracking mechanism, and may be applied to more accurately determine the movement and position of the media.

Figure 1:
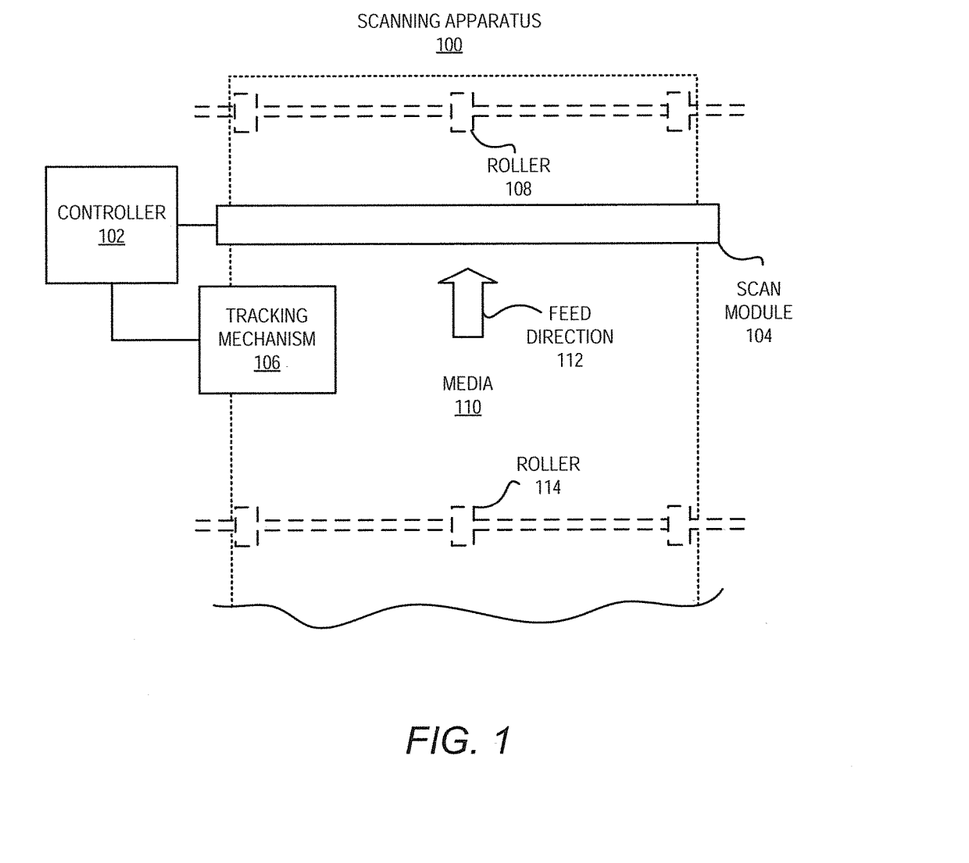
FIG. 1 is a simplified schematic diagram of a scanning apparatus, according to an example of the present disclosure.

With reference first to FIG. 1, there is shown a simplified schematic diagram of a scanning apparatus 100, according to an example. It should be understood that the scanning apparatus 100 depicted in FIG. 1 may include additional elements and that some of the elements depicted therein may be removed and/or modified without departing from a scope of the scanning apparatus 100.

As shown in FIG. 1, the scanning apparatus 100 may include a controller 102, a scan module 104, and a tracking mechanism 106. Generally speaking, the scanning apparatus 100 may scan information contained on a media 110, which may be a sheet of paper, a transparency, a blueprint, etc., as the media 110 is fed past the scan module 104 in the feed direction 112. Particularly, the scan module 104 may capture images of the information section by section, as the media 110 is fed by rollers 108, 114. The media 110 and the rollers 108, 114 are shown in dashed lines to denote that they may not form part of the scanning apparatus 100. Instead, for instance, the rollers 108, 114 may be components of an automatic document feeding apparatus to which the scanning apparatus 100 may be integrated. In this regard, the rollers 108, 114 may be driven by actuators (not shown) to cause the media 110 to be advanced. In addition, although not shown, the scanning apparatus 100 may be part of a multi-function device, such as a device that also includes printheads for printing onto media.

According to an example, the tracking mechanism 106 may track the actual position of the media 110 at a given time and may thus track the movement of the media 110 as the media 110 is advanced in the feed direction 112. The tracking mechanism 106 may be any suitable type of encoder, such as an optical encoder, a rotary encoder, etc. In particular, the tracking mechanism 106 may directly track the position of the media 110 instead of through detection of the roller 108, 114 movement.

The tracking mechanism 106 may also communicate signals corresponding to movement of the media 110 to the controller 102. In addition, the controller 102 may determine the actual current position of the media 110 from the received signals and may vary a timing at which the scan module 104 collects a scan of a section of the media 110 based upon the determined actual current position. The media 110 may be advanced by a series of rollers, for instance, the rollers 108 depicted in FIG. 1 as being downstream of the scan module 104 as well as rollers 114 positioned upstream of the scan module 104. The media 110 may also be advanced by other rollers (not shown). The rollers 108, 114 may be rotated by actuators, e.g., motors, that are to cause the media 110 to be advanced at a relatively high rate of speed to enable the media 110 to be scanned relatively quickly. For instance, for a 300 dots per inch (dpi) resolution scanning, the media 110 may be fed at a rate of approximately 1.5 inches per second and the scan module 104 may perform a scanning operation approximately every 1.5 milliseconds.

The speed at which the media 110 is advanced may not remain constant throughout advancement of the media 110. That is, for instance, the media 110 may be advanced at a first speed during a portion of the advancement and at a different, second speed during another portion of the advancement. The differences in speeds may occur due to the media 110 being moved by different individual rollers, slippage between the rollers and the media 110, etc. For instance, when the front edge of the media 110 initially contacts a set of rollers, the speed of the media 110 may be dramatically reduced and as the set of rollers begins to feed the media 110, the media 110 may undergo a sudden acceleration. The differences in speed may cause handoff errors between the sets of rollers which may result in visible errors in the scanned images of the media 110. That is, for instance, the media 110 may be advanced a larger or shorter distance than intended following the scanning of a current section and thus, the scanning of a subsequent section may not occur at an intended location on the media 110. As a result, a stitching error, e.g., a misalignment error, may be visible between the two scanned sections. That is, one scanned section may not correctly align with a next scanned section such that a visible misalignment appears when the scanned sections are stitched together.

According to an example, the controller 102 may control the timing at which the scan module 104 scans sections, such as rows, of the media 110 to prevent or minimize occurrences of stitching errors. Particularly, the controller 102 may control the timing based upon the actual position of the media 110 or, equivalently, the actual distance that the media 110 has traveled. Thus, in contrast to some scanning techniques that control scanning operations based solely on the amount of time elapsing between the scanning of subsequent sections, the controller 102 disclosed herein may more accurately control the scanning operations to prevent or minimize stitching errors from being visible in a scanned version of the media 110.

For instance, if the controller 102 determines that the actual current position is not the position at which the next section is to be scanned, the controller 102 may speed up or delay the time at which the scan module 104 captures an image of the next section. That is, if the actual position of the media 110 is behind a predefined position at which the next section is to be scanned, the controller 102 may delay the timing at which the scan module 104 is activated until the media 110 is determined to have moved a sufficient distance to cause the next section to be accurately positioned for scanning by the scan module 104. Alternatively, if the actual position of the media 110 is ahead of the predefined position at which the next section is to be scanned, the controller 102 may speed up the timing at which the scan module 104 is activated.

According to an example, the controller 102 may make the determination as to whether the timing at which the scan module 104 is to be to delayed or sped up at a rate that is greater than the rate at which a scanning operation is to occur. For instance, the controller 102 may make the determination about 4 to 6 times for each scanning operation. By way of particular example in which the scanning operation rate is set at every 4 milliseconds, the controller 102 may make the determination every millisecond. Thus, for instance, if the controller 102 determines that the actual position of the media 110 is ahead of the predefined position at which the next section is to be scanned, the controller 102 may activate the scan module 104 to scan the next section at 3 milliseconds following the scanning of the prior section.

The controller 102 may be a microprocessor, a microcontroller, an application specific integrated circuit (ASIC), or the like. According to an example, the controller 102 is a hardware component, such as a circuit. In another example, the controller 102 is to access machine readable instructions that cause the controller 102 to perform the operations disclosed herein. The machine readable instructions may be stored in a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored.

Figure 2:
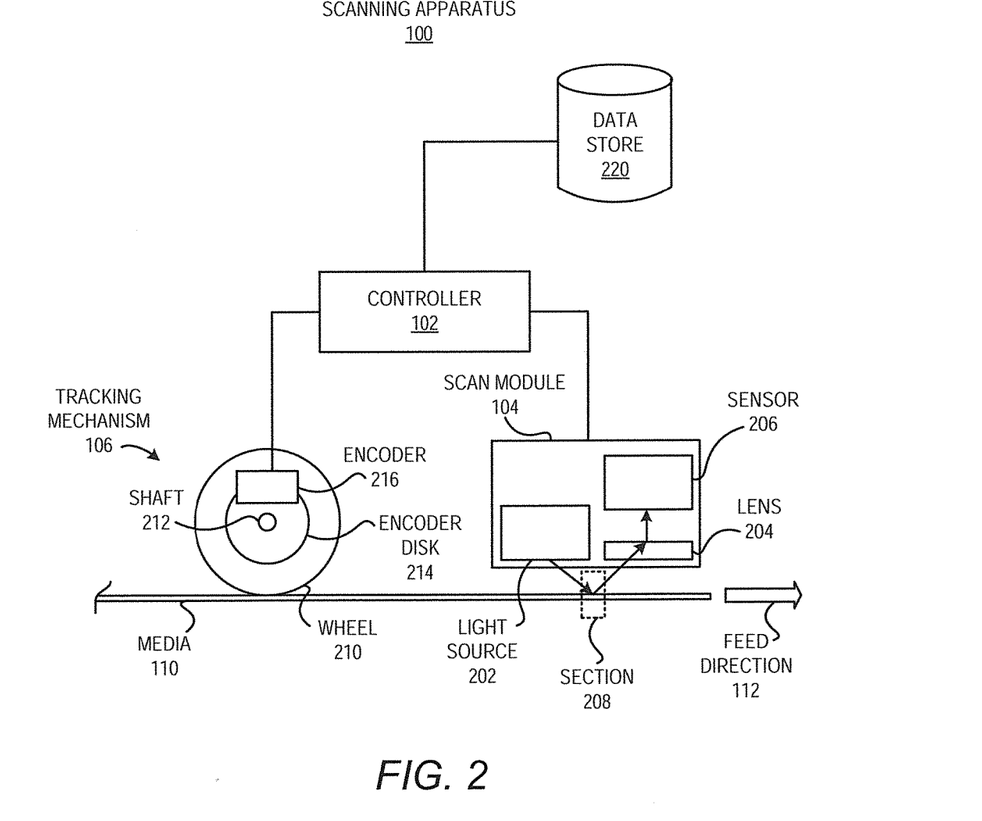
FIG. 2 is a simplified side view of the scanning apparatus depicted in FIG. 1, according to an example of the present disclosure.

Turning now to FIG. 2, there is shown a simplified side view of the scanning apparatus 100 depicted in FIG. 1, according to an example. It should be understood that the scanning apparatus 100 depicted in FIG. 2 may include additional elements and that some of the elements depicted therein may be removed and/or modified without departing from a scope of the scanning apparatus 100.

As shown in FIG. 2, the scan module 104, which may equivalently be denoted as a scan bar 104, may include a light source 202, a lens 204, and a sensor 206. During a scanning operation of a section 208, for instance, a section 208, of the media 110, the light source 202 may be activated to illuminate the section 208 of the media 110. Illumination of the section 208 of the media 110 may cause light to be reflected from the section of the media 110, in which the reflected light may include an image of the information contained at the illuminated section of the media 110. The reflected light may be conveyed or focused by the lens 204 into the sensor 206, which may detect the information contained in the reflected light. The information may be communicated to the controller 102, which may store the information in a data store 220. In addition, the media 110 may be advanced in the feed direction 112 and the scanning operation may be repeated for a next section of the media 110. This process may be repeated until the end of the media 110 is reached.

The controller 102 may store the information received from the scan module 104 during multiple scanning operations in the data store 220 and may stitch the information contained in adjacent sections 208 together to form a digital representation of the information contained on the media 110. As described herein, the controller 102 may control the timing at which the scan module 104 collects a scan of a next section of the media 110 to prevent or minimize occurrence of stitching errors in the stitched sections 208. The data store 220 may be volatile and/or non-volatile memory, such as DRAM, EEPROM, MRAM, phase change RAM (PCRAM), memristor, flash memory, and the like.

As also shown in FIG. 2, the tracking mechanism 106 is depicted as having a wheel 210 that is to rotate about a shaft 212. Particularly, the wheel 210 may be a freely rotating wheel that is rotated solely through contact with the media 110 and by movement of the media 110. In this regard, the wheel 210 may not be driven by an actuator, but instead, directly tracks the movement of the media 110. An encoder disk 214 may be connected to the wheel 210 such that the encoder disk 214 rotates at the same rate as the wheel 210. An encoder 216 may detect the rate at which the encoder disk 214 rotates and may generate signals corresponding to the detected rate. The encoder 216 may also communicate the signals to the controller 102, which may vary the timing at which the scan module 104 collects a scan of a next section on the media 110 as described herein. Although not shown, an index wheel may be attached to the shaft 212 such that the index wheel may rotate concurrently with the wheel 210. The index wheel may contain markings or other forms of indicia that identify different positions, such that, the rotational position of the index wheel, and thus, the wheel 210, may be determined from the markings. In one regard, the index wheel may be used to identify the rotational position of the wheel 210 and to compensate for a runout error in the wheel 210, which may be caused by defects in the wheel 210 as discussed herein.

It should be understood that the tracking mechanism 106 may be positioned at various other locations with respect to the scan module 104 without departing from a scope of the scanning apparatus 100 disclosed herein. For instance, the tracking mechanism 106 may be positioned beneath the media 110 and directly underneath the scan module 104. As another example, a pinch roller (not shown) may be provided directly opposite the wheel 210 such that the media 110 is pinched between the wheel 210 and the pinch roller. As a yet further example, the external surface of the wheel 210 may be formed to cause the wheel 210 to be rotated solely through frictional contact with the media 210. In any regard, the tracking mechanism 106 may be positioned in relatively close proximity to the scan module 104 to enable the position of a section of the media 110 that is at or near the scan module 104 to be determined.

Figure 3:
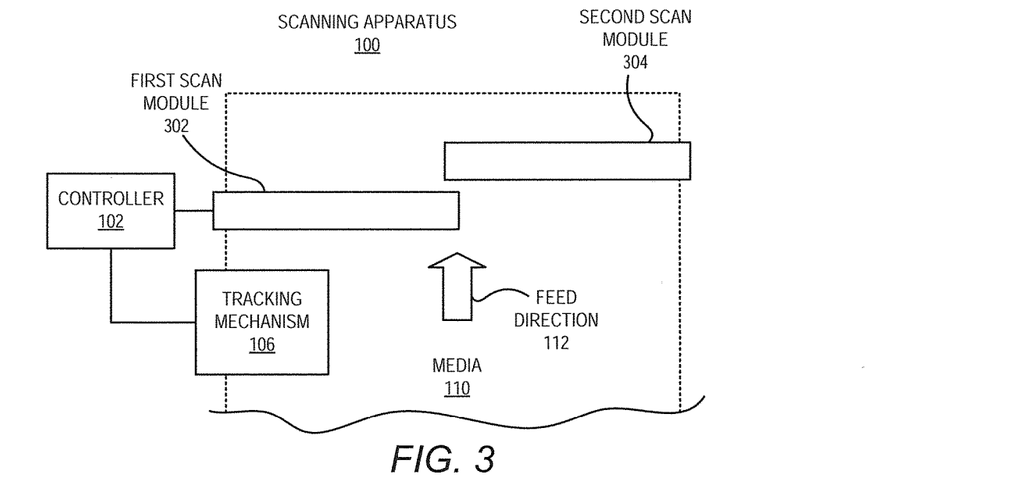
FIGS. 3 and 4, respectively, show simplified schematic diagrams of a scanning apparatus, according to two other examples of the present disclosure.
Figure 4:
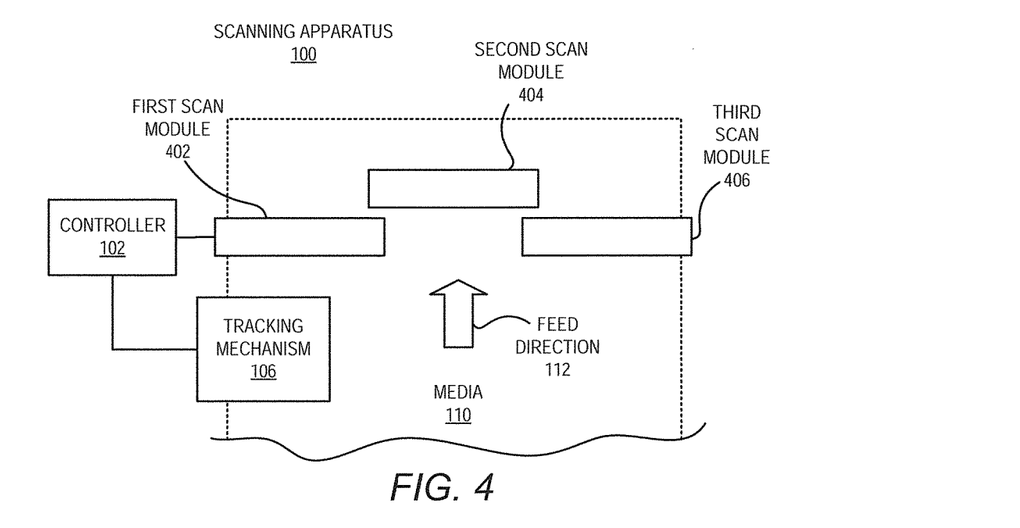

Turning now to FIGS. 3 and 4, there are respectively shown simplified schematic diagrams of a scanning apparatus 100, according to two other examples. The scanning apparatuses 100 depicted in FIGS. 3 and 4 may include all of the same features as the scanning apparatus 100 depicted in FIG. 1. However, the scanning apparatuses 100 depicted in FIGS. 3 and 4 differ from the scanning apparatus 100 depicted in FIG. 1 in that the scanning apparatuses 100 depicted in FIGS. 3 and 4 include multiple scan modules whereas the scanning apparatus 100 depicted in FIG. 1 includes a single scan module. The scanning apparatus 100 may have multiple scan modules as shown in FIGS. 3 and 4, for instance, because the costs associated with fabricating or obtaining smaller scan modules that do not extend the entire width of a media 110 may be significantly lower than the costs associated with fabricating or obtaining scan modules that extend the entire width of a media 110. The differences in cost may be relatively larger for scanning apparatuses 100 that are to scan large documents, such as blue prints, architectural drawings, maps, etc., and thus have relatively large widths over which scanning operations are performed.

The scanning apparatus 100 depicted in FIG. 3 is shown as having a first scan module 302 and a second scan module 304. Each of the first and second scan modules 302 and 304 may have a similar configuration to the scan module 104 depicted in FIG. 2. The first scan module 302 is depicted as being positioned to scan a first width section of the media 110 and the second scan module 304 is positioned to scan a second width section of the media 110. The second scan module 304 is also depicted as being positioned downstream of the first scan module 302 in the feed direction 112 such that the second scan module 304 is in a staggered relationship with respect to the first scan module 302. The second scan module 304 may be positioned in a staggered relationship with respect to the first scan module 302 because the sensors 206 in each of the first scan module 302 and the second scan module 304 may not extend to the edges of the modules 302, 304, for instance, because the housings of the module 302, 304 may not allow for the sensors 206 to extend to the edges. As such, placement of the second scan module 304 directly next to and in-line with the first scan module 304 may result in a gap in the media 110 between the modules 302, 304 that is not scanned by either of the modules 302, 304.

The scanning apparatus 100 depicted in FIG. 4 is shown as having a first scan module 402, a second scan module 404, and a third scan module 406. Each of the first, second, and third scan modules 402-406 may have a similar configuration to the scan module 104 depicted in FIG. 2. The first scan module 402 is depicted as being positioned to scan a first width section of the media 110, the second scan module 404 is positioned to scan a second width section of the media 110, and the third scan module 404 is depicted as being positioned to scan a third width section of the media 110. The third scan module 406 is depicted as being positioned in-line with the first scan module 402 along a direction that is perpendicular to the feed direction 112. The second scan module 404 is depicted as being positioned downstream of the first scan module 402 and the third scan module 406 in the feed direction 112 such that the second scan module 404 is in a staggered relationship with respect to the first scan module 402 and the third scan module 406.

The second scan module 404 may be positioned in a staggered relationship with respect to the first scan module 402 and the third scan module 406 because the sensors 206 in each of the first scan module 402, the second scan module 404, and the third scan module 406 may not extend to the edges of the modules 402-406, for instance, because the housings of the modules 402-406 may not allow for the sensors 206 to extend to the edges.

According to an example, the controller 102 may store information pertaining to the media 110 scanned by each of the scan modules at particular times and may stich the information together to form a digital copy of the image contained on the media 110. For instance, the controller 102 may stitch information obtained during a scan at a first time by the second scan module 404 with information obtained during a scan at a second time by the first scan module 402 and the third scan module 404. That is, the controller 102 may compensate for the staggered relationship between the first scan module 402, the second scan module 404, and the third scan module 406 in stitching together the information captured by each of these modules 402-406.

Figure 5:
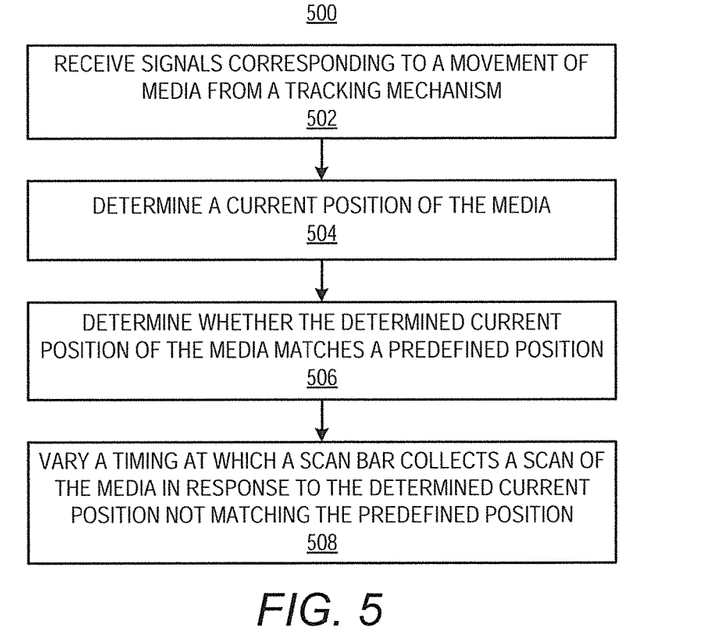
FIGS. 5-7, respectively, depict flow diagrams of methods for controlling a media scan operation, according to examples of the present disclosure.
Figure 6:
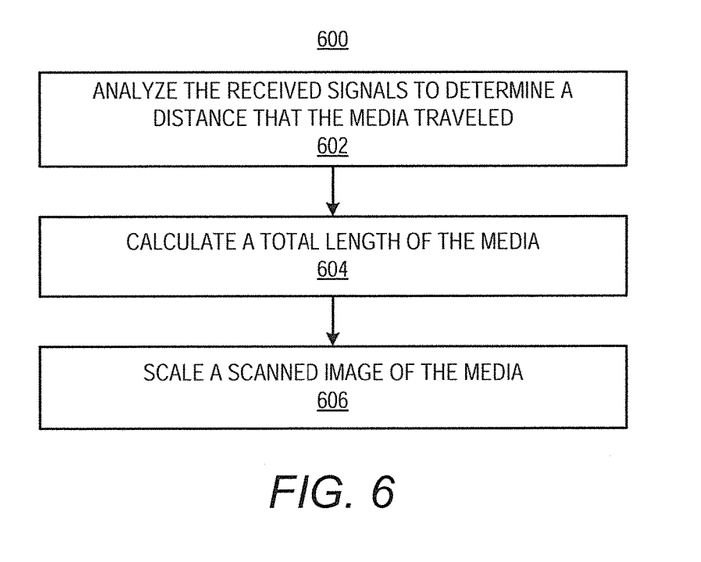
Figure 7:
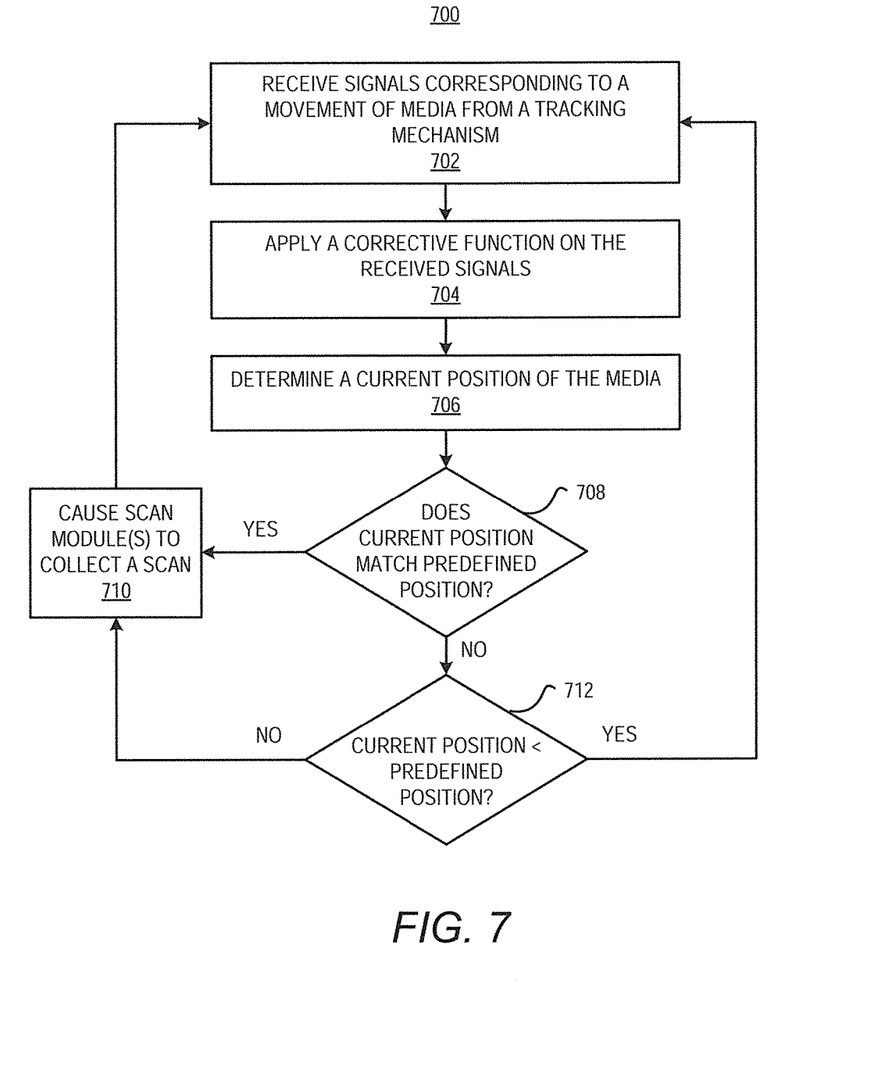

Various manners in which the controller 102 may be implemented are discussed in greater detail with respect to the methods 500-700 respectively depicted in FIGS. 5-7. Particularly, FIGS. 5-7, respectively, depict flow diagrams of methods 500-700 for controlling a media scanning operation, according to various examples. It should be apparent to those of ordinary skill in the art that the methods 500-700 may represent generalized illustrations and that other operations may be added or existing operations may be removed, modified, or rearranged without departing from the scopes of the methods 500-700. Generally speaking, the controller 102 depicted in FIGS. 1-4 may implement any of methods 500-700 to control a media scan operation, for instance, to reduce or remove the occurrence of stitching errors in combining scanned images of a media 110, particularly, when multiple staggered scan modules are implemented to capture the scanned images.

The descriptions of the methods 500-700 are made with reference to the scanning apparatus 100 illustrated in FIGS. 1-4 for purposes of illustration. It should, however, be clearly understood that scanning apparatuses having other configurations may be implemented to perform any of the methods 500-700 without departing from the scopes of the methods 500-700.

With reference first to the method 500 depicted in FIG. 5, at block 502, signals corresponding to a movement of media 110 may be received in a controller 102 from a tracking mechanism 106. As described above with respect to FIG. 2, the tracking mechanism 106 may include a wheel 210 that is to rotate solely based upon frictional contact with the media 110. In this regard, the rotation of the wheel 210 may directly coincide with the movement of the media 110. In addition, the rotation of the wheel 210 may be tracked at a relatively high resolution rate, e.g., in the micron scale, in the millimeter scale, etc., by an encoder 216. As shown in FIG. 2, an encoder disk 214 may rotate concurrently with the wheel 210 and the encoder 216 may detect the rotation of the encoder disk 214. In addition, the encoder 216 may generate signals corresponding to the detected rotation of the encoder disk 214 and may communicate the generated signals to the controller 102.

At block 504, the controller 102 may determine a current position of the media 110 based upon the received signals. For instance, the controller 102 may determine that a certain number of signals were received and may determine the distance the media 110 traveled based upon the received number of signals. That is, the controller 102 may access a correlation between the received number of signals and a distance of media 110 travel to determine the distance that the media 110 has traveled. The controller 102 may also determine the current position of the media 110 by adding the distance of media 110 travel to a previous position, e.g., the last known position of the media 110.

At block 506, the controller 102 may determine whether the determined current position of the media 110 matches a predefined position. The predefined position may be the position at which the media 110 is intended to be at a time when a scanning operation is to occur. That is, the predefined position may be the position of the media 110 corresponding to the correct position at which a scanning operation of the media 110 is to be performed such that the image collected during the scanning operation may be stitched together with an immediately prior collected image while reducing or minimizing stitching errors between the images.

At block 508, in response to a determination that the determined current position of the media 110 does not match the predefined position, the controller 102 may vary the timing at which a scan module 104 (scan bar 104), collects a scan of a section of the media 110. That is, if the controller 102 is to cause the scan module 104 to collect a scan of a section of the media 110 at a time T1, and if the determined current position of the media 110 does not match the predefined position, the controller 102 may cause the timing at which the scan module 104 collects a scan to occur either before or after the time T1. Additionally, at block 508, in instances in which the scanning apparatus 100 includes multiple scan modules, as shown in FIGS. 3 and 4, the controller 102 may vary the timing at which each of the multiple scan modules collects a scan of sections of the media 110. For instance, the controller 102 may delay the timing at which the scan modules 402-406 concurrently collect respective sections of the media 110.

According to an example, the controller 102 may implement or execute the method 500 at a faster rate than is nominal between scanning operations of adjacent sections or sections in the media 110. Thus, for instance, if the nominal timing between the scanning of a first section and a second section is 1.5 milliseconds, the controller 102 may implement or execute the method about every 0.3 seconds. In this manner, the controller 102 may determine that the media 110 has reached the predefined position earlier than the media 110 was intended to reach the predefined position and may vary the timing of the scan collection such that the collection occurs earlier than the 1.5 milliseconds. In contrast, the controller 102 may determine that the media has not yet reached the predefined position and may delay the timing at which the scan module 104 collects a scan of the section of the media until another iteration of the method 500 results in a determination that the media 110 is at the predefined position.

Turning now to FIG. 6, there is shown a flow diagram of a method 600 that may be implemented after or in conjunction with the method 500. At block 602, the signals received at block 502 (method 500) may be analyzed to determine the distance that the media 110 traveled. For instance, the controller 102 may analyze all of the received signals corresponding to the media 110, e.g., from a start to a finish of the scanning of the media 110, to determine the total distance that the media 110 traveled.

At block 604, the controller 102 may calculate the total length of the media 110 from the determined total distance that the media 110 traveled. In addition, at block 606, the controller 102 may scale a scanned image of the media 110 based upon the calculated total length. That is, for instance, the controller 102 may scale the scanned image of the media 110 such that the scanned image is equivalent in size to the information contained on the media 110.

Turning now to FIG. 7, there is shown a flow diagram of a method 700 for controlling a media scanning operation, according to another example. The method 700 includes some of the same features as those described above with respect to the method 500. Particularly, for instance, at block 702, similarly to block 502, signals corresponding to a movement of media 110 may be received in a controller 102 from a tracking mechanism 106.

At block 704, the controller 102 may apply a corrective function on the received signals. Generally speaking, the corrective function is to compensate for a defect in the tracking mechanism 106 in tracking the movement of the media 110 and may be a transform or transfer function. The defect in the tracking mechanism 106 may result in a runout error and may include, for instance, defects to the wheel 210, such as the wheel 210 not being perfectly round or having imperfections. Other defects may include the wheel 210 not being perfectly mounted on the shaft 212 such that the radius of the wheel 210 from the shaft 212 is not uniform throughout the wheel 210. In the event that the tracking mechanism 106 contains to defects, the correction function may be equal to one or may not be applied at block 704.

According to an example, the tracking mechanism 106 may be tested to identify that the tracking mechanism 106 contains a defect. In addition, the corrective function may be a transform function that is applied on the signals received from the encoder 216 to compensate for the defect. The corrective function may be determined through a suitable testing procedure, such as through a determination of the correlation between the received number of signals and the distance that the media 110 has traveled.

At block 706, the controller 102 may determine a current position of the media 110 based upon the received signals with the corrective function applied to the received signals. In this regard, the controller 102 may more accurately determine the current position of the media 110 based upon the signals received from the tracking mechanism 106.

At block 708, the controller 102 may determine whether the determined current position of the media 110 matches a predefined position. The controller 102 may make this determination in manners similar to those described above with respect to block 506 in the method 500.

In response to a determination that the current position matches the predefined position, the controller 102 may cause the scan module 104 to collect a scan of a section 208 of the media 110, as indicated at block 710. In instances in which the scanning apparatus 100 includes multiple scan modules 302, 304 or 402-406, the controller 102 may cause the scan modules 302, 304 or 402-406 to collect scans of respective sections of the media 110, as indicated at block 710.

In response to a determination that the current position does not match the predefined position at block 708, the controller 102 may determine whether the current position is behind the predefined position, as indicated at block 712. In response to a determination that the current position is not behind the predefined position, i.e., the current position is ahead of the predefined position, the controller 102 may cause the scan module(s) to collect a scan of a section(s) of the media 110 at block 710. In other words, the current position of the media 110 may have reached the predefined position prior to the nominal time at which the media 110 was to reach the predefined position and thus, the controller 102 may cause the section(s) to be scanned earlier than the nominal time. It should be understood that the alternative may be determined at block 712. That is, for instance, a determination may be made as to whether the current position is ahead of the predefined position, in which case, the "YES" and the "NO" may be reversed.

However, in response to a determination that the current position is behind the predefined position at block 712, the controller 102 may delay scanning by the scan module(s). In addition, the controller 102 may receive signals corresponding to movement of the media 110 from the tracking mechanism 106 at block 702. In addition, blocks 702-712 may be repeated until the controller 102 causes the scan module(s) to collect a scan of a section(s) of the media 110. Blocks 702-712 may also be repeated following the collection of the scan at block 710 until the method 700 is terminated, for instance, when the entire media 110 has been scanned.

Some or all of the operations set forth in the methods 500-700 may be contained as utilities, programs, or subprograms, in any desired computer accessible medium. In addition, the methods 500-700 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 8:
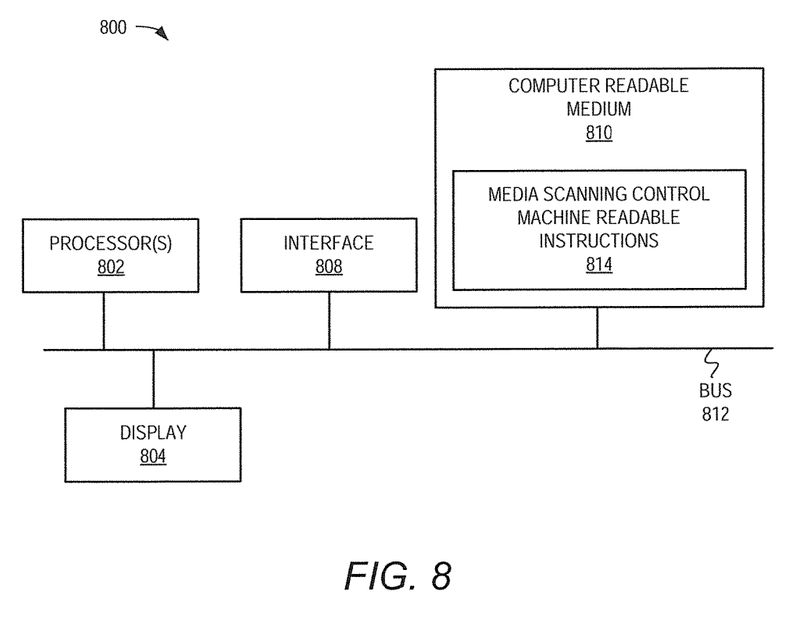
FIG. 8 is schematic representation of a controller, which may be equivalent to the controller depicted in FIGS. 1-4, according to an example of the present disclosure.

Turning now to FIG. 8, there is shown a schematic representation of a controller 800, which may be equivalent to the controller 102 depicted in FIGS. 1-4, according to an example. The controller 800 may include a processor 802, a display 804; an interface 808 through which the processor 802 may communicate with the tracking mechanism 106 and the scan module 104; and a computer-readable medium 810. Each of these components may be operatively coupled to a bus 812. For example, the bus 812 may be an EISA, a PCI, a USB, a FireWire, a NuBus, or a PDS.

The computer readable medium 810 may be any suitable medium that participates in providing instructions to the processor 802 for execution. For example, the computer readable medium 810 may be non-volatile media, such as an optical or a magnetic disk; volatile media, such as memory. The computer-readable medium 810 may also store media scanning control machine readable instructions 814, which, when executed may cause the processor 802 to perform some or all of the methods 500-700 depicted in FIGS. 5-7.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a first scan module to scan a section of a media;
   a second scan module positioned downstream of the first scan module in a direction in which the media is fed past the first scan module, wherein the second scan module is to scan along a different width section of the media as compared to the first scan module;
   a tracking mechanism to track the media as the media is moved past the first scan module;
   a controller to:

receive signals corresponding to the media movement from the tracking mechanism;

determine, based upon the received signals, a current position of the media;

vary a timing at which the first scan module collects a scan of the section of the media based upon the determined current position of the media; and vary a timing at which the second scan module collects a scan of another section of the media based upon the determined current position of the media.

2. The apparatus according to claim 1, wherein the controller is further to:

determine, based upon the determined current position of the media, whether the media is currently at a predefined position; and vary the timing by delaying collection by the first scan module of the section of the media in response to a determination that the media is currently not at the predefined position.

3. The apparatus according to claim 2, wherein, to determine the current position of the media, the controller is further to apply a corrective function on the received signals, wherein the corrective function compensates for a defect in the tracking mechanism in tracking the media.

4. The apparatus according to claim 1, further comprising:

a third scan module, wherein the third scan module is to scan along a different width section of the media as compared with the first scan module and the second scan module; and wherein the controller is to also vary a timing at which the third scan module collects a scan of a further section of the media based upon the determined current position of the media.

5. The apparatus according to claim 1, wherein the tracking mechanism comprises:

a wheel to contact the media, wherein the wheel is to be rotated solely by movement of the media; and an encoder to detect rotation of the wheel and to communicate the signals corresponding to the detected rotation of the wheel to the controller.

6. The apparatus according to claim 5, wherein the encoder has a micron scale resolution.

7. The apparatus according to claim 1, wherein the controller is further to:

analyze signals received from the tracking mechanism to determine a distance that the media traveled;

calculate a total length of the media from the determined distance that the media traveled; and scale a scanned image of the media based upon the calculated total length.

8. A method comprising:

receiving, in a controller, signals corresponding to a movement of media from a tracking mechanism that directly tracks movement of the media;

determining, by the controller, based upon the received signals, a current position of the media;

determining, by the controller, whether the determined current position of the media matches a predefined position; and in response to a determination that the determined current position of the media does not match the predefined position, varying, by the controller, a timing at which a scan bar collects a scan of a section of the media.

9. The method according to claim 8, further comprising:

applying a transform function on the received signals, wherein the transform function is to compensate for defects in the tracking mechanism in tracking the media, and wherein determining the current position of the media further comprises determining the current position of the media based upon the received signals with the transform function applied to the received signals.

10. The method according to claim 8, further comprising:

varying a timing at which a plurality of scan bars positioned to concurrently collect scans of different sections of the media collect scans of the different sections in response to the determination that the current position of the media does not match the predefined position.

11. The method according to claim 8, further comprising:

determining whether the current position of the media is behind or ahead of the predefined position;

in response to a determination that the current position of the media is behind the predefined position, delaying the timing at which the scan bar collects the scan of the section of the media; and in response to a determination that the current position of the media is ahead of the predefined position, speeding up the timing at which the scan bar collects the scan of the of the section of the media.

12. The method according to claim 8, further comprising:

analyzing signals received from the tracking mechanism to determine a distance that the media traveled;

calculating a total length of the media from the determined distance that the media traveled; and scaling a scanned image of the media based upon the calculated total length.

13. A system comprising:

a controller;

a plurality of scan modules to concurrently scan different sections of a media;

a tracking mechanism to track the media as the media is moved past the plurality of scan modules, wherein the tracking mechanism is to directly track movement of the media;

wherein the controller is to receive signals corresponding to the media movement from the tracking mechanism, determine, based upon the received signals, a current position of the media, and in response to a determination that the determined current position of the media is behind a predefined position, delay collection of scans of sections of the media by the plurality of scan modules.

14. The system according to claim 13, wherein the tracking mechanism includes a wheel to contact the media, wherein the wheel is to be rotated solely through movement of the media and an encoder to detect rotation and position of the wheel, wherein the encoder is to communicate the signals corresponding to the detected rotation and position of the wheel to the controller, and wherein the controller is to apply a corrective function on the received signals, wherein the corrective function compensates for a defect in the tracking mechanism in tracking the media.

* * * * *

UNITED STATES PATENT AND TRADEMARK OFFICE
CERTIFICATE OF CORRECTION

PATENT NO.         : 10,200,554 B2
APPLICATION NO.    : 15/569886
DATED              : February 5, 2019
INVENTOR(S)        : Jorge Miguel Gomez Lucia et al.

Page 1 of 1

It is certified that error appears in the above-identified patent and that said Letters Patent is hereby corrected as shown below:

In the Claims

In Column 12, Lines 27-28, in Claim 11, delete "of the of the" and insert -- of the --, therefor.

Signed and Sealed this
Fourteenth Day of May, 2019

Andrei Iancu
*Director of the United States Patent and Trademark Office*